(12) United States Patent
Hahn et al.

(10) Patent No.: US 9,817,377 B2
(45) Date of Patent: Nov. 14, 2017

(54) OPERATOR SYSTEM FOR A MACHINE

(71) Applicant: KRONES AG, Neutraubling (DE)

(72) Inventors: Wolfgang Hahn, Neutraubling (DE); Timo Pronold, Regensburg (DE); Johannes Böhm, Regensburg (DE)

(73) Assignee: KRONES AG, Neutraubling (DE)

( * ) Notice: Subject to any disclaimer, the term of this patent is extended or adjusted under 35 U.S.C. 154(b) by 303 days.

(21) Appl. No.: 14/429,314

(22) PCT Filed: Sep. 13, 2013

(86) PCT No.: PCT/EP2013/068971
§ 371 (c)(1),
(2) Date: Mar. 18, 2015

(87) PCT Pub. No.: WO2014/048766
PCT Pub. Date: Apr. 3, 2014

(65) Prior Publication Data
US 2015/0220071 A1  Aug. 6, 2015

(30) Foreign Application Priority Data

Sep. 27, 2012 (DE) .......... 10 2012 217 572

(51) Int. Cl.
*G08B 21/18* (2006.01)
*G05B 15/02* (2006.01)
*G05B 19/409* (2006.01)

(52) U.S. Cl.
CPC .......... *G05B 15/02* (2013.01); *G05B 19/409* (2013.01); *G05B 2219/36159* (2013.01); *G05B 2219/36163* (2013.01)

(58) Field of Classification Search
CPC ................. G08B 21/18; G05B 15/02
(Continued)

(56) References Cited

U.S. PATENT DOCUMENTS 4,916,439 A * 4/1990 Estes ............ G08B 1/08
340/539.1
5,309,328 A   5/1994 Lum
(Continued)

FOREIGN PATENT DOCUMENTS

CN   1135702 A   11/1996
CN   102030125 A   4/2011
(Continued)

OTHER PUBLICATIONS

International Search Report for Application No. PCT/EP2013/068971, dated Jan. 30, 2014.
(Continued)

*Primary Examiner* — Brent Swarthout
(74) *Attorney, Agent, or Firm* — Marshall, Gerstein & Borun LLP

(57) ABSTRACT

An operator system for a machine, in particular for a beverage processing machine, having a mobile operator device for the machine, a signal emitter for reporting alarm and/or warning signals, and a carrying device for the operator device, wherein the operator device has a coupling element for attaching to the machine and/or to the carrying device and a transmitter for transmitting alarm and/or warning signals, wherein the signal emitter has an attachment element for attaching to an article of clothing and/or to a body part of a user and a receiver for the alarm and/or warning signals, and wherein the carrying device has a mounting element for attaching to an article of clothing and/or to a body part of the user and a receptacle for the operator device.

14 Claims, 3 Drawing Sheets

(58) Field of Classification Search
USPC .................................................. 340/540, 679
See application file for complete search history.

(56) References Cited

U.S. PATENT DOCUMENTS

| | | | |
|---|---|---|---|
| 6,297,742 B1* | 10/2001 | Canada et al. ................. | 340/635 |
| 2004/0140617 A1 | 7/2004 | Cordell | |
| 2005/0134458 A1* | 6/2005 | Leyden ................ | G08B 13/149 |
| | | | 340/568.2 |
| 2007/0200722 A1 | 8/2007 | Piety et al. | |
| 2010/0264176 A1 | 10/2010 | Snell | |
| 2010/0292960 A1* | 11/2010 | Sung .................... | F24F 11/0086 |
| | | | 702/184 |
| 2012/0108215 A1 | 5/2012 | Kameli | |
| 2017/0004697 A1* | 1/2017 | Boerhout ............... | G08B 21/18 |

FOREIGN PATENT DOCUMENTS

| | | |
|---|---|---|
| DE | 3614744 A1 | 11/1987 |
| DE | 60204271 T2 | 1/2006 |
| DE | 202006017127 U1 | 3/2008 |
| DE | 102007025796 A1 | 12/2008 |
| DE | 102010025781 A1 | 1/2012 |
| EP | 0814397 A2 | 12/1997 |
| EP | 2136274 A1 | 12/2009 |
| EP | 2306254 A1 | 4/2011 |
| GB | 2204426 A | 11/1988 |
| GB | 2362633 A | 11/2001 |
| WO | WO-2005/020179 A1 | 3/2005 |

OTHER PUBLICATIONS

German Search Report for Application No. 102012217572.5, dated Apr. 18, 2013.
Notification of First Office Action for Application No. 201380061968.9, dated Jul. 18, 2016.

* cited by examiner

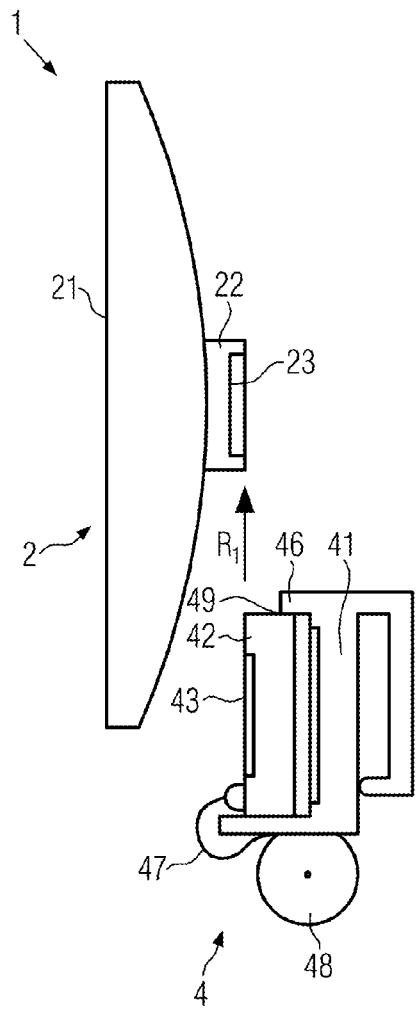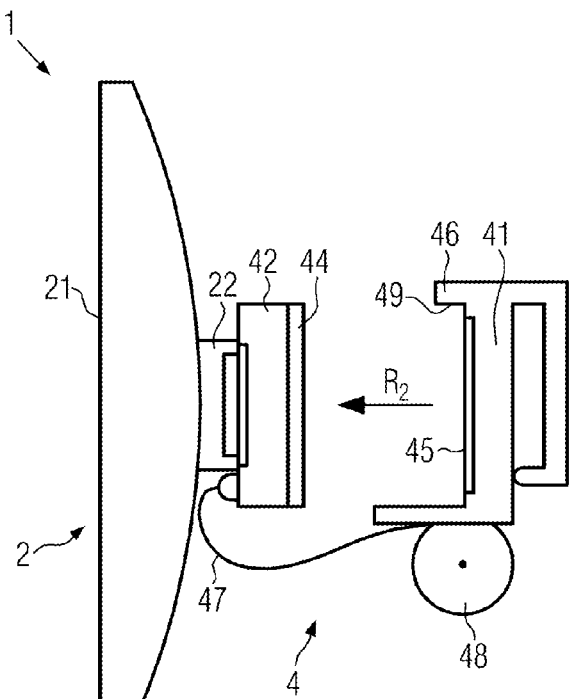
FIG. 3a
FIG. 3b

OPERATOR SYSTEM FOR A MACHINE

CROSS-REFERENCE TO RELATED APPLICATION

The present application is the US national phase of International Patent Application No. PCT/EP2013/068971, filed Sep. 13, 2013, which application claims priority to German Application No. 102012217572.5, filed Sep. 27, 2012. The priority application, DE 102012217572.5, is hereby incorporated by reference.

FIELD OF THE DISCLOSURE

The present invention relates to an operator system for a machine, in particular a beverage processing machine, to a mobile operator device, a carrying device and a signal emitter.

BACKGROUND

When servicing beverage processing plants, a user normally operates the individual machines via an operator system. The operator system can e.g. be used for triggering individual sequences of operations in the machine, adjusting parameters and/or receiving alarm and/or warning signals. To this end, stationary operator devices and, to an increasing extent, also mobile operator devices are used, the mobile operator devices being compatible with the entire plant and adapted to be used for different machines. The user can here take along a mobile operator device to the respective machine and can simultaneously execute or supervise functions of other machines.

The user, for example, puts down the mobile operator device in the area of a specific machine and, while carrying out repair work, he will be able to keep an eye on the display of the mobile operator device for reading information thereon. Likewise, he will be able to control individual components of the machine via the mobile operator device so as to carry out the repair. In addition, alarm and warning signals of the machine in question and/or of other machines will be displayed to the user, who can thus decide whether a more urgent repair of some other machine should perhaps be given preference.

Such operator systems with mobile operator devices often prove to be non-ergonomic in practice, since the user has to carry them in his hand and since, normally, there are no possibilities of depositing them in a stable manner on the machine during servicing. After the repair of a machine it may, moreover, easily happen that the mobile operator device is left behind on the machine and that the user has to return in order to get it. In addition, the user may easily fail to hear alarm and/or warning signals, since, during servicing, he works e.g. in the interior of the machine or in noisy surroundings.

Therefore, it is the object of the present invention to provide an operator system that is more ergonomic to handle.

SUMMARY OF THE DISCLOSURE

This object is achieved by operator system for a machine, in particular for a beverage processing machine, having a mobile operator device for the machine, a signal emitter for reporting alarm and/or warning signals, and a carrying device for the operator device, wherein the operator device comprises a coupling element for attaching to the machine and/or to the carrying device and a sensor for transmitting alarm and/or warning signals, wherein the signal emitter comprises an attachment element for attaching to an article of clothing and/or to a body part of a user and a receiver for the alarm and/or warning signals, and wherein the carrying device comprises a mounting element for attaching to an article of clothing and/or to a body part of the user and a receptacle for the operator device.

Due to the fact that the operator device comprises a coupling element for attaching to the machine and/or to the carrying device, the user, when carrying the operator device, can attach it to the receptacle of the carrying device on the one hand, whereas, during servicing, he can attach it to the machine. Hence, the user need not hold the operator device in his hands, neither during servicing nor when he carries it to the next machine, i.e. his hands will be free for other activities. Simultaneously, the coupling element for attaching to the machine allows the operator device to be held on the machine in a stable manner, while the user's hands are free for repair work. At the same time, the user may wear, e.g. on his arm, a signal emitter, which informs him of alarm and/or warning signals from the operator device. These alarm and/or warning signals can thus be transmitted from the transmitter of the operator device to the receiver of the signal emitter, where they can be announced to the user. Due to the fact that the signal emitter is attached directly on an article of clothing and/or a body part of the user, the user will no longer fail to notice the alarm and/or warning signals. In addition, the operator device may also be outside the user's reach, the alarm and/or warning signals being, however, nevertheless announced via the signal emitter. The carrying device additionally allows easy transport of the operator device, without restraining the user from other activities.

Hence, the operator system according to the present invention supports the user in an ergonomic manner in operating and/or servicing the machine.

The operator system may be provided for a plant, in particular for a beverage processing plant. The plant may comprise at least one machine. The machine may be arranged in a beverage processing plant. The machine may comprise a computer-based machine control. The machine may be a beverage processing machine and/or a container treatment machine, which is especially a stretch blow molder, a rinser, a filler, a capper, a labeler and/or a packaging machine or some other beverage processing machine and/or some other container treatment machine.

The mobile operator device may comprise a microprocessor, a keyboard and/or a display, which may especially be touch-sensitive. Likewise, the mobile operator device may comprise individual control knobs. The mobile operator device may comprise a data interface for machine control of the machine, in particular a wireless data interface. The wireless data interface may be a Bluetooth interface or a WLAN interface. The mobile operator device may be a tablet computer or a smart phone. The coupling element for attaching to the machine and/or to the carrying device may be glued onto the housing as an additional element. Alternatively, the coupling element may be attached to the mobile operator device by a mounting bracket. The coupling element may comprise electric connection terminals by means of which signals are transmitted to the machine and/or the carrying device.

The signal emitter may comprise a wristband, a chain that can be worn around the neck, a clip and/or a clasp for attaching to the article of clothing and/or the body part of the user. The signal emitter may comprise a microprocessor and/or a battery for power supply. The power supply may here especially be provided for the receiver and/or the microprocessor.

The mounting element of the carrying device may be configured as a buckle, a clip or a clasp. The mounting element may especially be configured for attaching to a belt. The receptacle for the operator device may be a protective cover and/or a bag.

In the case of the operator system for a machine, the coupling element may comprise a magnet, a ferromagnetic metal element, a locking element and/or a Velcro fastener. The operator device can thus be attached to the machine particularly easily. For example, the operator device can be attached directly to a metal part of the machine by means of the magnet.

The signal emitter may comprise a vibrator, an acoustic signal emitter and/or an optical signal emitter. The vibrator imparts to the user an activation stimulus, which he can perceive independently of the noise in the surroundings. The same can also be achieved by the optical signal emitter. In addition, the user's attention can be drawn to the alarm and/or warning signals by the acoustic signal emitter, if he does not have direct visual contact with the signal emitter. The signal emitter may reproduce different types of alarm and/or warning signals as differently encoded vibration, audio and/or light signals. The different codes may have different intensities or rhythms. The optical signal emitter may display different types of alarm and/or warning signals with different colors. The optical signal emitter may comprise a display.

In the operator system, the transmitter and the receiver may comprise a wireless transmission unit for transmitting the alarm and/or warning signals as radio signals. This allows a particularly reliable and convenient mode of transmitting the alarm and/or warning signals. The wireless transmission unit may comprise a Bluetooth transmission device and/or a WLAN transmission device. In addition, the signal emitter may comprise a transmitter and the operator device may comprise a receiver, which are in particular assigned to the wireless transmission unit. The wireless transmission unit can thus be used for transmitting data from the operator device to the signal emitter as well as, vice versa, from the signal emitter to the operator device. For example, control commands can be transmitted from the signal emitter to the operator device in this way. Likewise, confirmation signals for the alarm and/or warning signals can be sent back from the signal emitter to the operator device. The signal emitter may here comprise keys.

The signal emitter may be a mobile phone. Thus, the mobile phone, which the user normally carries with him, is used as a signal emitter and the user need not carry any separate signal emitter. At the same time, the handling of the system can be simplified and the acquisition of the operator system is less cost-intensive. The mobile phone may here comprise a vibrator, an acoustic and/or an optical signal emitter. In addition, the mobile phone can display the message assigned to the alarm and/or warning signal on its display.

In the carrying device, the receptacle may be configured as a mating coupling for the coupling element, wherein said mating coupling is releasably or non-releasably connected to the mounting element, and, in particular, wherein said mating coupling and/or said mounting element comprise a magnet, a ferromagnetic metal element, a locking element or a Velcro fastener. The operator device can thus be coupled via its coupling element into the mating coupling of the carrying device in a particularly easy manner. In addition, the operator device can thus be retained on the carrying device particularly safely for the purpose of transport. The coupling element of the operator device can here be configured such that it can releasably be connected to the mating coupling and/or the machine. The coupling element may comprise a magnet and the mating coupling may comprise a ferromagnetic metal element. These components may also be arranged vice versa. Due to the magnetic force, it is particularly easy to releasably connect the coupling element to the ferromagnetic metal plate in the mating coupling of the carrying device.

The mobile operator device and the carrying device may be connected to one another via a connection band. The connection band can prevent the operator device from being left behind in the machine. The connection band may be a cord, a flat band or a chain. The connection band may comprise an elastic or a coil element. On the basis of this arrangement, the operator device, when carried, can be connected directly to the carrying device and, after having been detached, it can be connected indirectly via the connection band.

The mating coupling may be connected directly or indirectly to the mounting element via the connection band. After having been carried, the operator device can thus be disengaged from the mating coupling and can then be free or it can be removed from the mounting element together with the mating coupling and can remain reliably connected to the mounting element via the connection band. In other words, the user is able to decide, upon removing the operator device, whether or not the latter will then remain reliably connected to the mounting element through the connection band. In particular, the operator device can be protected against losing by means of the connection band.

A retaining projection on the mounting element may be configured to prevent disengagement of the mating coupling from the mounting element along one direction. Simultaneously, the mating coupling can be disengaged from the mounting element along a different direction. This provides in a particularly easy manner the possibility of leaving the mating coupling behind on the mounting element when the operator device is removed along one direction, but disengaging it therefrom when the removal takes place along a different direction.

A roll, in particular with a spring mechanism, may be configured to wind and unwind the connection band. This prevents the connection band from hanging down as a loose loop.

The roll may be arranged on the mounting element. The roll can thus be arranged in a particularly space-saving manner.

The signal emitter can be integrated in the carrying device. Since the carrying device is also attached to an article of clothing and/or a body part of the user, it may additionally accommodate the signal emitter and advance the alarm and/or warning signals to the user. Hence, the user need not attach a plurality of functional units in the area of his body and costs can be saved through the integration.

In addition, the present invention provides a mobile operator device for an operator system in particular for a beverage processing machine, wherein a coupling element for attaching to a machine and/or to a carrying device is formed, and wherein the operator device comprises a transmitter for transmitting alarm and/or warning signals to a signal emitter.

This allows the mobile operator device to be attached to the machine safely as well as in an ergonomically advantageous manner. In addition, the operator device can be attached to the carrying device and can be carried in an ergonomically particularly advantageous manner. Due to the fact that the operator device comprises a transmitter for transmitting alarm and/or warning signals to a signal emitter, the respective signals can be transmitted from the operator device to the signal emitter, if the user should not be in close vicinity to the mobile operator device. For example, a user can no longer hear the mobile operator device directly in particularly noisy surroundings, but the signal emitter, which is located in close vicinity to the user's body, can still be heard. The alarm and/or warning signals from the operator device can thus nevertheless be transmitted to the user.

The coupling element may comprise a magnet, a locking element and/or a Velcro fastener. The coupling element can thus be coupled to the machine and/or the carrying device particularly easily.

The present invention additionally provides a carrying device for an operator system wherein a mounting element for attaching to an article of clothing and/or to a body part of a user is provided, wherein a mating coupling is releasably or non-releasably connected to the mounting element and adapted to be coupled to a coupling element of a mobile operator device, and wherein the mating coupling is directly or indirectly connected to the mounting element via a connection band.

Due to the mounting element, the carrying device can be attached to an article of clothing and/or a body part of the user in a particularly simple manner. Simultaneously, the mating coupling can be coupled to the coupling element of the mobile operator device particularly easily and the operator device can thus be carried particularly easily. Simultaneously, the mating coupling can also be disengaged from the mounting element and is indirectly connected to the mounting element via the connection band. The mobile operator device is thus prevented from being left behind on a machine.

The mating coupling and/or the mounting element may comprise a magnet, a ferromagnetic metal element, a locking element and/or a Velcro fastener. Coupling between the mating coupling and the mounting element can thus be realized particularly easily. Simultaneously, a releasable connection between the mating coupling and the coupling element of the operator device can be established in a particularly easy manner.

The mating coupling may be connected to the mounting element directly or indirectly via a connection band. The connection band may be a cord, a flat band or a chain. The operator device coupled to the mating coupling can thus be prevented from being left behind on the machine by the user.

A retaining projection may be formed on the mounting element for preventing disengagement of the mating coupling from the mounting element along one direction. Thus, disengagement of the mating coupling can be prevented along one direction and, consequently, the coupling element of the operator device is detached from the mating coupling during this movement. Subsequently, the operator device is completely free. In a different direction, the operator device is detached from the mounting element together with the mating coupling, and the mating coupling can here remain connected to the mounting element via the connection band. Hence, the user can choose whether he protects the operator device against losing, when he removes the same.

A roll on the mounting element may be configured for winding and unwinding the connection band. In particular, the roll may comprise a spring mechanism. Hence, the connection band can be wound up particularly easily. This prevents the connection band from hanging down freely.

In addition, the present invention provides a signal emitter for an operator system, wherein an attachment element for attaching to an article of clothing and/or to a body part of a user is formed and wherein the signal emitter comprises a receiver for receiving alarm and/or warning signals from an operator device for a machine.

The user can thus carry the signal emitter close to his body and, in the case of an alarm received by the operator device, he will be warned immediately.

The signal emitter may comprise a vibrator, an acoustic signal emitter and/or an optical signal emitter. Thus, the user can receive the alarm and/or warning signals in noisy surroundings. The signal emitter may be configured for emitting as a signal various alarm and/or warning signals with different intensities or rhythms, which can be adjusted especially by the user. The optical signal emitter may be configured for displaying various alarm and/or warning signals with different colors.

The signal emitter may be a mobile phone. Thus, an already existing mobile phone may be used for fulfilling the function of a signal emitter.

The signal emitter may be integrated in the carrying device. The user thus has to wear only one device on his body and costs can be saved through the integration.

The transmitter and the receiver may comprise a wireless transmission unit for transmitting the alarm and/or warning signals as radio signals. The alarm and/or warning signals can thus be transmitted in a particularly reliable manner and without direct visual contact.

In addition, the operator device may comprise a receiver and the signal emitter may comprise a transmitter for the signals. This allows the user to send a confirmation signal via the signal emitter to the operator device. For example, alarms may here be confirmed. The receiver in the operator device and the transmitter in the signal emitter may also comprise a wireless transmission unit. The wireless transmission unit may comprise a respective transmitter in the operator device and in the signal emitter.

Likewise, the operator device and/or the signal emitter may each comprise a Bluetooth and/or a WLAN transmitter. The operator device and/or the signal emitter can be connected to an existing network infrastructure in this way.

The operator system may comprise a separate camera and the operator device may be configured for displaying, on the user's demand, the picture of said separate camera on the display. The separate camera may be configured for imaging conditions at individual points of the machine. For example, it would be imaginable that the filling level of containers for preforms, caps, labels or of other containers is displayed or that critical points of the plant are displayed, at which malfunctions or other problems occur comparatively frequently. The separate camera may also be a mobile camera. Thus, its position can be changed at any time.

Additional features and advantages of the present invention will be explained in the following with reference to the exemplary figures, in which:

BRIEF DESCRIPTION OF THE SEVERAL VIEWS OF THE DRAWINGS

FIG. 3a shows a side view of the operator system according to FIG. 2, in which the operator device is removed from the carrying device in a first direction;
and
FIG. 3b shows a side of the operator system according to FIG. 2, in which the operator device is removed from the carrying device in a second direction that is different from the direction of removal illustrated in FIG. 3a.

DETAILED DESCRIPTION OF THE PREFERRED EMBODIMENTS

Figure 1:
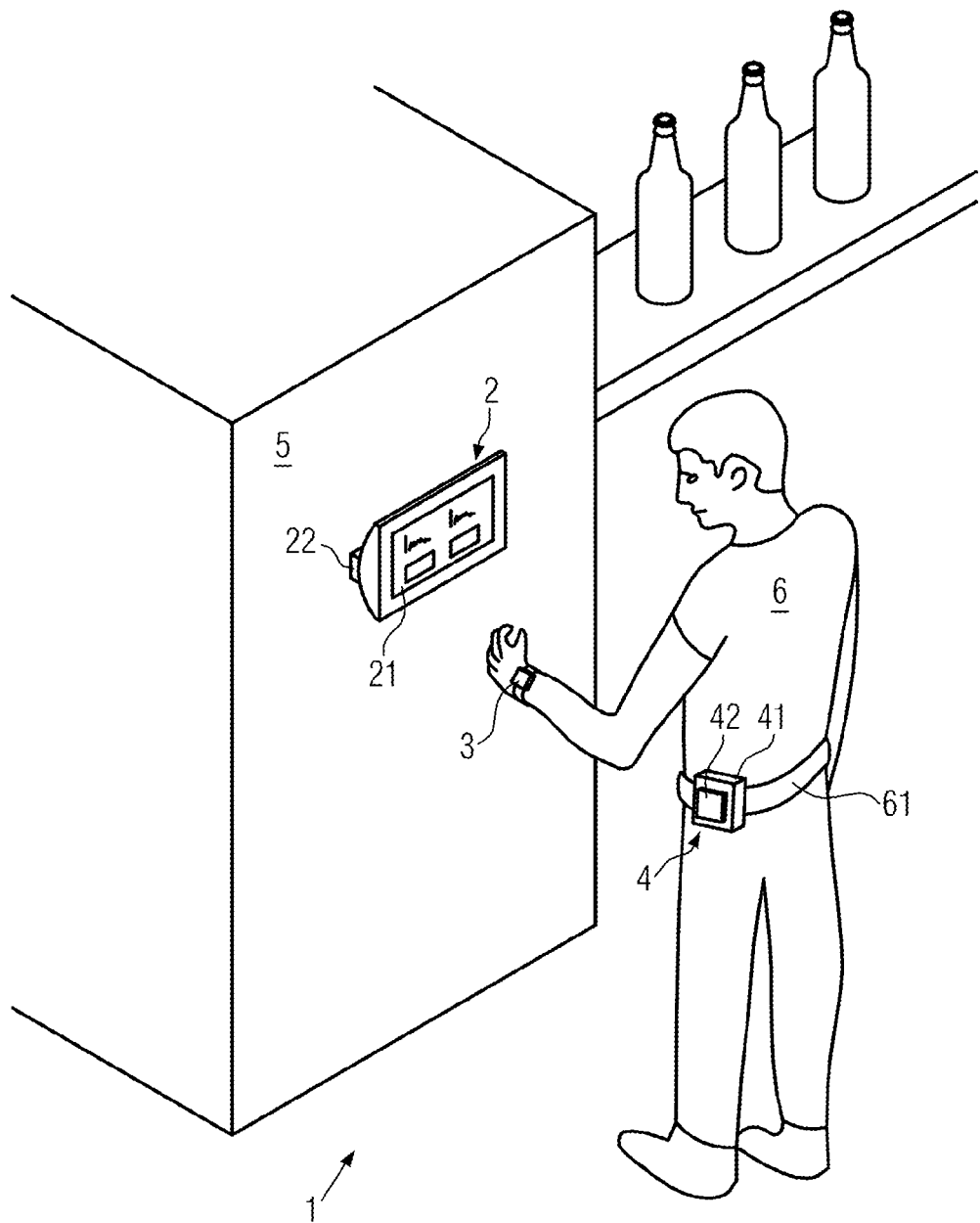
FIG. 1 shows a perspective view of an operator system.

FIG. 1 shows a perspective view of an operator system 1 according to the present invention. It can be seen that a user 6 stands in front of a machine 5 to be serviced. The machine 5 shown is here a beverage processing machine.

The user 6 wears a belt 61 having the carrying device 4 attached thereto. The carrying device 4 is here attached via the mounting element 41, which is configured as a loop and through which the belt 61 is passed. The mounting element 41 has provided thereon a mating coupling 42 used for coupling the operator device 2.

In addition, it can be seen that the operator device 2 is attached to the machine 5. The coupling element 22 is here used for attaching the operator device 2 to the machine 5. This coupling element 22 comprises here a magnet, which holds the operator device 2 on the metallic housing of the machine 5 in a particularly reliable manner. The operator device 2 can also be detached from the machine 5 by the user 6. The operator device 2 additionally comprises a touch-sensitive display 21 which, via an operating software, offers the user 6 the possibility of entering data into the machine 5 and viewing respective messages. In addition, alarm and/or warning signals of the machine in question and of other machines can be received and confirmed in this way.

The operator device 2 is adapted to be coupled to the mating coupling 42 of the carrying device 4 via the coupling element 22. To this end, the mating coupling 42 includes a ferromagnetic metal plate to which the magnet of the coupling element 22 adheres particularly well. If the user 6 wants to take along the operator device 2 to some other machine, he can take off the operator device 2 from the machine 5 and attach it to the mating coupling 42 of his carrying device 4. This allows the user 6 to move on to the other machine in an ergonomically advantageous manner, without having to hold the operator device 2 in his hands.

In addition, the user 6 wears a signal emitter 3 on his wrist. The operator device 2 can here transmit the alarm and warning signals via a transmitter to a receiver in the signal emitter 3. The signal emitter 3 includes a vibrator, which applies a vibrating signal to the wrist of the user 6. The user 6 will thus be able to receive alarm and/or warning signals from the operator device 2, if he is not able to look directly at the display 21 of the operator device 2. For example, he will still be able to receive the alarm and warning signals, when he carries out a servicing operation within the machine 5.

Hence, the operator system 1 shown in FIG. 1 allows servicing of machines 5 in a particularly ergonomic manner, since the operator device 2 can be attached to the machine 5 as well as to the carrying device 4. The user 6, in turn, has his hands free for servicing the machine 5. In addition, the signal emitter 3 informs him of important events. The signal emitter 3 also emits a warning signal, if the user 6 should leave behind the operator device 2 on the machine 5. Hence, the user need not walk a long distance for picking up the operator device 2 which he left behind.

Figure 2:
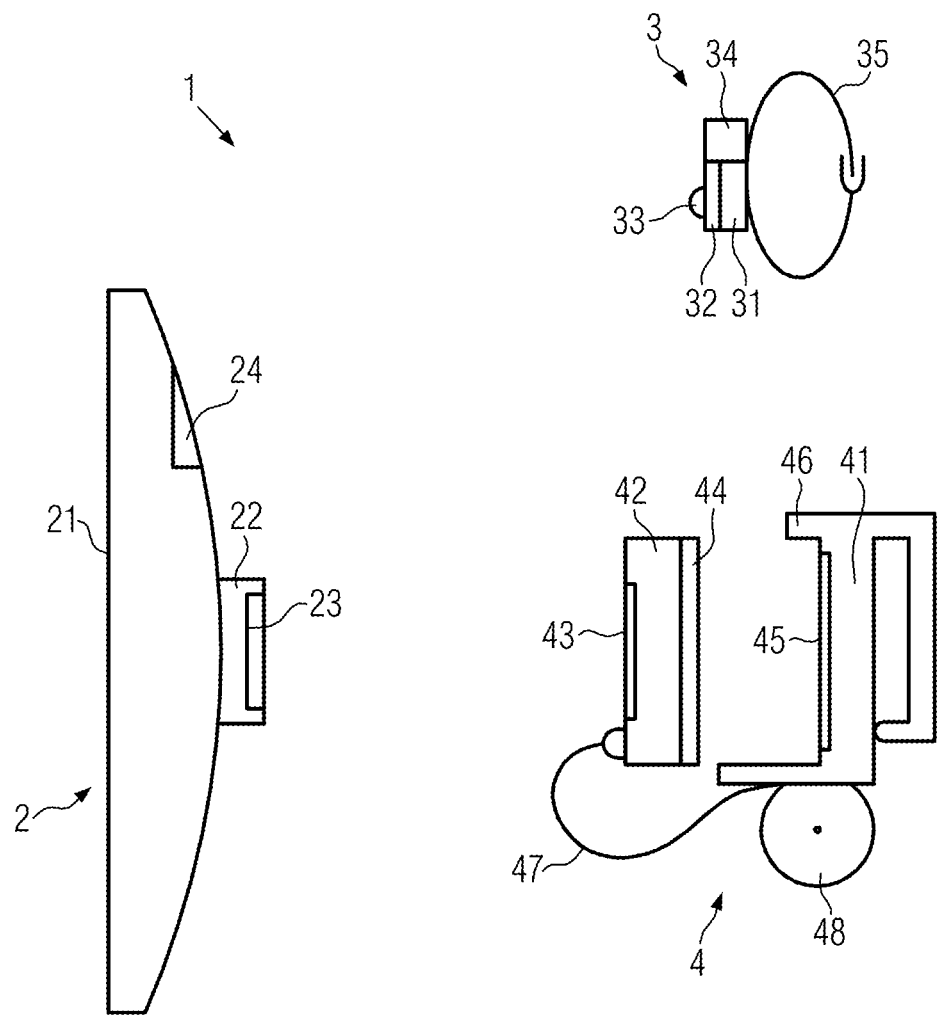
FIG. 2 shows a side view of another operator system.

FIG. 2 shows a side view of a further operator system 1 according to the present invention. The figure shows the operator device 2, which, via the coupling element 22, can be attached to a machine (which is here not shown) as well as to the carrying device 4. The carrying device 4 is configured such that it can be attached to a belt of a user (not shown either) by means of the mounting element 41. Also the signal emitter 3 is shown, by means of which alarm and warning signals from the operator device 2 can be signalized to the user. The signal emitter 3 can here be attached to the user's wrist.

The operator device 2 comprises a touch-sensitive display 21 on which the user can read messages as well as enter commands. The operator device 2 is connected to the machine via a wireless interface, said wireless interface comprising in particular a data interface between the operator device 2 and a machine control. It can also be seen that the operator device 2 comprises a transmitter 24, which is part of a wireless transmission unit. The operator device 2 is thus able to emit alarm and warning signals as radio signals. In addition, a coupling element 22 including a first magnet 23 is provided on the back of the operator device. Alternatively, this may also be Velcro fastener.

The operator device 2 can be coupled to the mating coupling 42 of the carrying device 4 via the coupling element 22 and the first magnet 23. In addition, the operator device 2 can also be attached to ferromagnetic metal parts of the machine in this way.

The mating coupling 42 comprises, on the side of the operator device, a ferromagnetic metal plate 43 to which the first magnet 23 adheres particularly well. On the other side, the mating coupling 42 comprises, in turn, also a second magnet 44 by means of which the mating coupling 42 can be attached to the mounting element 41. To this end, also the mounting element 41 includes a ferromagnetic metal plate 45 to which the second magnet 44 adheres particularly well and from which it can also be detached. On the other side of the mounting element 41, also a hook can be seen by means of which the mounting element can be hooked onto the user's belt.

In addition, the mating coupling 42 is connected to the mounting element 41 via a connection band 47. This connection band 47 can be wound up automatically by means of a roll 48, said roll 48 including a spring mechanism. In addition, the roll 48 is provided with a brake that can be activated and subsequently released by pulling the connection band 47. The connection band 47 can thus be maintained in a specific, suitable length. In addition, the mounting element 41 comprises a retaining projection 46, which will be explained in more detail hereinbelow making reference to FIGS. 3A and 3B.

The signal emitter 3 can be attached to the user's wrist via the connection loop 35. The connection loop 35 comprises here a closure mechanism. In addition, the signal emitter 3 comprises a receiver 34 for the alarm and warning signals from the operator device 2. This receiver 34 is configured as a radio receiver and it is part of the wireless transmission unit. The receiver 34 is here able to receive and interpret the signals of the operator device 2 transmitted via radio. In addition, the signal emitter 3 comprises a vibrator 31, an acoustic signal emitter 32 and an optical signal emitter 33. The alarm and warning signals can thus be transmitted to the user as a particularly broad spectrum of activation stimuli. However, the signal emitter 3 may also offer only one of the three above-mentioned possibilities. The signal emitter 3 has here a particularly light and ergonomic structural design. Furthermore, the signal emitter 3 comprises a battery and a microprocessor for processing the alarm and warning signals.

In FIGS. 3A and 3B, the operator system 1 according to FIG. 2 is shown, the operator device 2 being removed from the carrying device 4 in two different directions $R_1$, $R_2$.

In FIG. 3A it can be seen how the operator device 2 is removed from the carrying device 4 in a direction $R_1$. The direction $R_1$ is here largely perpendicular to a planar retaining area 49 of the retaining projection 46 and parallel to the surface of the coupling element 22, in particular to the magnet 23. Due to the fact that the retaining projection 46 blocks the movement of the mating coupling 42, the mating coupling 42 remains in the mounting element 41. The magnet 23 is thus removed transversely from the respective counterplate 43 in the mating coupling 42. At the same time, the connection band 47 remains in the roll 48. The operator device 2 is thus fully released from the carrying device 4 and can now be positioned freely on the machine by the user.

FIG. 3B, however, shows that the operator device 2 is removed from the carrying device 4 in a direction $R_2$. The direction $R_2$ is here substantially parallel to the planar retaining area 49 of the retaining projection 46. The retaining projection 46 can thus not hold the mating coupling 42 in the mounting element 41 and the magnet 44 disengages from the respective counter-plate 45 of the mounting element 41. The operator device 2 remains connected to the mounting element 41 via the mating coupling 42 and the connection band 47. The operator device 2 is thus protected against losing. In addition, the connection band 47 unwinds from the roll 48, so as to prevent a formation of loops that may become entangled.

The embodiments of the carrying device 4 for the operator system 1 in FIGS. 2, 3A and 3B thus allow the user to decide freely whether he removes the operator device 2 from the carrying device 4 with or without protection through the connection band 47.

The features specified in the above-described embodiments are not limited to these special combinations and may also be provided in arbitrary other combinations.

The invention claimed is:

1. An operator system for a machine, in particular for a beverage processing machine, comprising;
a mobile operator device for the machine,
a signal emitter for reporting at least one of alarm or warning signals, and
a carrying device for the operator device,
wherein the operator device comprises
a coupling element for attaching to at least one of the machine or the carrying device and
a transmitter for transmitting at least one of alarm signals or warning signals,
wherein the signal emitter comprises
an attachment element for attaching to at least one of an article of clothing or to a body part of a user and
a receiver for the at least one of alarm signals or warning signals, and
wherein the carrying device comprises
a mounting element for attaching to at least one of an article of clothing or to
a body part of the user and
a receptacle for the operator device,
wherein the receptacle is configured as a mating coupling for the coupling element, wherein said mating coupling is one of releasably or non-releasably connected to the mounting element, and wherein at least one of said mating coupling or said mounting element comprise one of a magnet, a ferromagnetic metal element, a locking element or a hook-and-loop fastener.

2. The operator system for a machine according to claim 1, wherein the coupling element comprises at least one of a group including a magnet, a ferromagnetic metal element, a locking element and a hook-and-loop fastener.

3. The operator system for a machine according to claim 1, wherein the signal emitter comprises a vibrator, an acoustic signal emitter and an optical signal emitter.

4. The operator system for a machine according to claim 1, wherein the transmitter and the receiver comprise a wireless transmission unit for transmitting the at least one of alarm signals or warning signals as radio signals.

5. The operator system for a machine according to claim 1, wherein the signal emitter is a mobile phone.

6. The operator system for a machine according to claim 1, wherein the mobile operator device and the carrying device are connected to one another via a connection band.

7. The operator system for a machine according to claim 1, wherein the mating coupling is one of directly or indirectly connected to the mounting element via the connection band.

8. The operator system for a machine according to claim 7, wherein a retaining projection on the mounting element is configured to prevent disengagement of the mating coupling from the mounting element along a direction ($R_1$).

9. The operator system for a machine according to claim 6, wherein a roll with a spring mechanism is configured to wind and unwind the connection band.

10. The operator system for a machine according to claim 9, wherein the roll is arranged on the mounting element.

11. A carrying device for an operator system according to claim 1, wherein a mounting element for attaching to at least one of an article of clothing or a body part of a user is provided, wherein a mating coupling is one of releasably or non-releasably connected to the mounting element and adapted to be coupled to a coupling element of a mobile operator device, and wherein the mating coupling is one of directly or indirectly connected to the mounting element via a connection band.

12. A mobile operator device for an operator system according to claim 1, in particular for a beverage processing machine, wherein a coupling element for attaching to at least one of a machine or to a carrying device is formed, and wherein the operator device comprises a transmitter for transmitting alarm at least one alarm of signals or warning signals to a signal emitter.

13. The operator system according to claim 11, wherein the signal emitter is integrated in the carrying device.

14. A signal emitter for an operator system according to claim 1, wherein an attachment element for attaching to an article of clothing or to a body part of a user is formed, and wherein the signal emitter comprises a receiver for receiving at least one of alarm signals or warning signals from an operator device for a machine.

* * * * *